(12) United States Patent
Cook et al.

(10) Patent No.: US 10,679,759 B2
(45) Date of Patent: Jun. 9, 2020

(54) METHOD OF COOLING NUCLEAR REACTOR AND NUCLEAR REACTOR INCLUDING POLYHEDRAL BORON HYDRIDE OR CARBORANE ANIONS

(71) Applicant: CERADYNE, INC, Costa Mesa, CA (US)

(72) Inventors: Kevin S. Cook, Carl Junction, MO (US); Beth D. Bosley, Valencia, PA (US)

(73) Assignee: Ceradyne, Inc., Costa Mesa, CA (US)

(*) Notice: Subject to any disclaimer, the term of this patent is extended or adjusted under 35 U.S.C. 154(b) by 904 days.

(21) Appl. No.: 14/777,293

(22) PCT Filed: Mar. 14, 2014

(86) PCT No.: PCT/US2014/027162
§ 371 (c)(1),
(2) Date: Sep. 15, 2015

(87) PCT Pub. No.: WO2014/197076
PCT Pub. Date: Dec. 11, 2014

(65) Prior Publication Data
US 2016/0019989 A1    Jan. 21, 2016

Related U.S. Application Data

(60) Provisional application No. 61/789,284, filed on Mar. 15, 2013.

(51) Int. Cl.
| *G21C 15/28* | (2006.01) |
| *G21C 5/12* | (2006.01) |
| *G21C 9/033* | (2006.01) |
| *G21C 13/00* | (2006.01) |
| *G21C 15/18* | (2006.01) |

(52) U.S. Cl.
CPC .............. *G21C 15/28* (2013.01); *G21C 5/12* (2013.01); *G21C 5/123* (2013.01); *G21C 9/033* (2013.01); *G21C 13/00* (2013.01); *G21C 15/18* (2013.01); *Y02E 30/40* (2013.01)

(58) Field of Classification Search
CPC ........ G21C 13/00; G21C 15/18; G21C 15/28; G21C 5/12; G21C 5/123; G21C 9/033
USPC .................................................. 376/282, 217
See application file for complete search history.

(56) References Cited

U.S. PATENT DOCUMENTS

| 3,089,835 A | 5/1963 | Schulten et al. |
| 3,148,938 A | 9/1964 | Knoth |
| 3,169,045 A | 2/1965 | Miller |
| 3,328,134 A | 6/1967 | Miller |
| 3,355,261 A | 11/1967 | Miller |
| 3,390,966 A | 7/1968 | Knoth |
| 3,498,879 A | 3/1970 | Dastur |
| 3,961,017 A | 6/1976 | Hough |
| 4,115,520 A | 9/1978 | Dunks |
| 4,115,521 A | 9/1978 | Dunks |
| 4,150,057 A | 4/1979 | Sayles |
| 4,153,672 A | 5/1979 | Dunks |
| 4,391,993 A | 7/1983 | Sayles |
| 4,495,140 A * | 1/1985 | Kochka ................ G21C 9/033 376/207 |
| 4,640,827 A | 2/1987 | Salentine |
| 4,844,856 A | 7/1989 | Cohen |
| 4,968,478 A | 11/1990 | Burda |
| 5,045,275 A | 9/1991 | Abdel-Khalik |
| 5,082,618 A * | 1/1992 | Dagard ................... G21C 7/22 376/219 |
| 5,443,732 A | 8/1995 | Lahoda |
| 5,503,812 A | 4/1996 | Kirishima |
| 6,203,624 B1 | 3/2001 | Bargues et al. |
| 6,525,224 B1 * | 2/2003 | Spielvogel ............ C07F 5/027 568/1 |
| 7,161,040 B2 | 1/2007 | Franken |
| 7,524,477 B2 | 4/2009 | Spielvogel |
| 7,563,934 B2 | 7/2009 | Banavali |
| 7,641,879 B2 | 1/2010 | Spielvogel |
| 7,718,154 B2 | 5/2010 | Ivanov |
| 7,803,288 B2 | 9/2010 | Hayashi et al. |
| 7,955,580 B2 | 6/2011 | Spielvogel |
| 2006/0286020 A1 | 12/2006 | Ivanov |
| 2008/0285701 A1* | 11/2008 | Meseth ................ G21C 9/033 376/282 |

(Continued)

FOREIGN PATENT DOCUMENTS

| DE | 19748222 | 7/1999 |
| JP | 63-61191 | 3/1988 |

(Continued)

OTHER PUBLICATIONS

Paskevicius, "First-order Phase Transition in the U2B12H12 System", Phys. Chem. Chem. Phys. 2013, 15, 15825-15828. (Year: 2013).*

(Continued)

*Primary Examiner* — Jack W Keith
*Assistant Examiner* — Daniel Wasil

(57) ABSTRACT

A method of cooling a nuclear reactor core is disclosed. The method includes contacting the nuclear reactor core with an aqueous solution comprising at least one of polyhedral boron hydride anions or carborane anions. Nuclear reactors are also disclosed. The nuclear reactor has a neutron moderator that is an aqueous solution comprising at least one of polyhedral boron hydride anions or carborane anions, or the nuclear reactor has an emergency core cooling system including a vessel containing a volume of an aqueous solution comprising at least one of polyhedral boron hydride anions or carborane anions. The nuclear reactor can also have both an aqueous solution comprising at least one of polyhedral boron hydride anions or carborane anions as a neutron moderator and an emergency core cooling system that includes an aqueous solution comprising at least one of polyhedral boron hydride anions or carborane anions.

20 Claims, No Drawings

(56) References Cited

U.S. PATENT DOCUMENTS

| | | |
|---|---|---|
| 2010/0239062 A1 | 9/2010 | Yeon |
| 2010/0246746 A1 | 9/2010 | Connor |
| 2011/0110481 A1 | 5/2011 | Greenspan |
| 2011/0110482 A1 | 5/2011 | Greenspan |
| 2011/0110483 A1 | 5/2011 | Greenspan |
| 2012/0043483 A1 | 2/2012 | Bowen, III |
| 2012/0043502 A1 | 2/2012 | Eastwood |
| 2012/0243651 A1 | 9/2012 | Malloy |
| 2013/0170599 A1* | 7/2013 | Muller ............... G21C 9/033 376/282 |
| 2016/0019989 A1 | 1/2016 | Cook |

FOREIGN PATENT DOCUMENTS

| | | |
|---|---|---|
| JP | 6-194493 | 7/1994 |
| JP | H09-080192 | 3/1997 |
| JP | 2002-022888 | 1/2002 |
| JP | 2003-050294 | 2/2003 |
| JP | 2013-205137 | 10/2013 |
| JP | 2014-48190 | 3/2014 |

OTHER PUBLICATIONS

Dunks, "A One-Step Synthesis of $B_{11}H_{14}$—from $NaBH_4$," Inorganic Chemistry, 1978, vol. 17, No. 6, pp. 1514-1516.

Franken, "Preparation of [closo-$CB_{11}H_{12}$] by Dichlorocarbene Insertion Into [nido-$B_{11}H_{14}$]", Collection of Czechoslovak Chemical Communications, 2001, vol. 66, pp. 1238-1249.

Grimes, "Boron Clusters Come of Age," Journal of Chemical Education, vol. 81, No. 5, May 31, 2004, pp. 657-672.

Hill, "From Sodium Borohydride to 1,2-Dicarba-closo-Dodecaboranes", Boron Chemistry-4, Pergamon Press, 1979, pp. 33-39.

Jelinek, "Chemistry of Compounds With the L-Carba-Closo-Dodecaborane(12) Framework", Collection of Czechoslovak Chemical Communications, 1986, vol. 51, pp. 819-829.

Jiang, "Experimental Research on the Gravity-Driven Boron Injection System for a 200 MW Nuclear Heating Reactor," Annals of Nuclear Energy, 2001, vol. 28, pp. 251-263.

Knoth, "1-$B_9H_9CH$- and $B_{11}H_{11}CH$-," Journal of the American Chemical Society, Mar. 1, 1967, vol. 89, No. 5, pp. 1274-1275.

Knoth, "C-Amminecarbaundecaborane(12) Derivatives and Cesium Tridecahydro-Carbaundecaborate(1-)," Inorganic Syntheses 1968, vol. 11, pp. 33-41.

Makhlouf, "Practical Synthesis for Decahydrocaborates," Inorganic Chemistry, Jun. 1967, vol. 6, No. 6, pp. 1196-1198.

Mongeot, "$(Et_4N)_2B_{10}H_{10}$ et $(Et_4N)_2B_{12}H_{12}$; synthesis de $Et_4$, $NBH_4$, separation et purification," Bulletin De La Societe Chimique De France, 1986, No. 3, pp. 385-389.

Reed, "Carborane acids. New "strong yet gentle" acids for organic and inorganic Chemistry," Chemical Communications, Feb. 25, 2005, pp. 1669-1677.

Reed, "Carboranes: A New Class of Weakly Coordinating Anions from Strong Electrophiles, Oxidants, and Superacids," Accounts of Chemical Research, Feb. 24, 1998, vol. 31, No. 3, pp. 133-139.

Strauss, "The Search for Larger and More Weakly Coordinating Anions," Chemical Reviews, 1993, vol. 93, No. 3, pp. 927-942.

Volkov, "Preparation of Dodecahydro-closododecaborates(2-) by the Reaction of Alkali Metal Tetrahydroborates with Triethylamine-Borane," Russian Journal of Inorganic Chemistry, 1979, vol. 24, No. 10, pp. 1571-1572.

Technology Description, Boron Specialties LLC, Control No. 0670-4625, concept paper for an application for funding from Advanced Research Projects Agency-Energy, submitted by the inventors more than one year before Apr. 25, 2014, 4 pages.

International Search Report for PCT International Application No. PCT/US2015/027305, dated Aug. 13, 2015, 3 pages.

\* cited by examiner

US 10,679,759 B2

METHOD OF COOLING NUCLEAR REACTOR AND NUCLEAR REACTOR INCLUDING POLYHEDRAL BORON HYDRIDE OR CARBORANE ANIONS

CROSS-REFERENCE TO RELATED APPLICATION

This application is a national stage filing under 35 U.S.C. 371 of PCT/US2014/027162, filed Mar. 14, 2014, which claims priority to U.S. Provisional Application No. 61/789,284, filed Mar. 15, 2013, the disclosure of which is incorporated by reference in its entirety herein.

BACKGROUND

Generally, in nuclear power generation, thermal energy is generated by the chain fission of a fissionable material (e.g., thorium, uranium, and plutonium), and power necessary for electric power generation is derived from the thermal energy. The fissionable material is typically prepared in the form of a sintered body and contained in a nuclear fuel rod. Nuclear fuel rods are arranged in a bundle to form a nuclear fuel assembly. In a nuclear reactor, a control rod and a moderator are generally used to control the number and speed of extra neutrons and prevent a chain reaction (reactivity:>1) of fissionable materials. The moderator can include heavy water ($D_2O$), light water ($H_2O$), graphite, and beryllium, for example. Nuclear reactors may be classified into types depending on the nature of the moderator. For example, light-water nuclear reactors (LWR) include pressurized water reactors (PWR) and boiling water reactors (BWR). Other types of nuclear reactors include heavy-water nuclear reactor (HWR), which include a heavy water moderator, and high-temperature gas-cooled reactors (HTGR).

Emergency shutdown procedures are critical for safety in nuclear power plants. To stop a nuclear reactor, control rods formed of solid neutron poison materials (e.g., zirconium hydride) are generally inserted into a core. Emergency core cooling systems are also required for nuclear reactors. The emergency core cooling system functions to stop operations of the nuclear reactor and to prevent an increase in temperature of the nuclear reactor. An emergency core cooling system typically includes a supply of an aqueous solution including soluble boron. Typically, the emergency pool typically contains a boric acid solution or, in some cases, a sodium pentaborate solution that is pumped into the reactor to quench the fission reaction.

SUMMARY

The use of boric acid in emergency shutdown procedures for nuclear reactors poses some problems. The solubility of boric acid in water is typically reported to be about 4.7 grams per 100 grams of solution at 20° C. The low concentration of soluble boron in a typical emergency shutdown system can require large amounts of water to be introduced to the reactor system during quench, and such large amounts of water can rupture safety seals. Furthermore, boric acid deposits can cause corrosion, and as a result, introduction of boric acid during an emergency event will typically result in the reactor core being unrecoverable. The corrosiveness of boric acid can also limit its utility in reactors during normal operation to control neutron flux.

An aqueous solution comprising at least one of polyhedral boron hydride anions or carborane anions is provided in the method and nuclear reactors according to the present disclosure. The polyhedral boron hydride anions or carborane anions, which in some embodiments comprise at least one of $B_{10}H_{10}^{2-}$, $B_{11}H_{14}^{-}$, $CB_{11}H_{12}^{-}$, or $B_{12}H_{12}^{2-}$, have a larger weight percent of boron than boric acid, and at least some of the salts from which they dissociate are more soluble in water than boric acid. As a result, typically, the aqueous solutions comprising at least one of polyhedral boron hydride anions or carborane anions have greater boron availability than boric acid solutions, which can lead to faster quenching of a nuclear reactor core in an emergency situation with less water required. The aqueous solution comprising at least one of polyhedral boron hydride anions or carborane anions is also expected to lead to less system corrosion than boric acid solutions.

In one aspect, the present disclosure provides a method of cooling a nuclear reactor core. The method includes contacting the nuclear reactor core with an aqueous solution comprising at least one of polyhedral boron hydride anions or carborane anions.

In another aspect, the present disclosure provides a nuclear reactor. The nuclear reactor includes an aqueous solution comprising at least one of polyhedral boron hydride anions or carborane anions. The aqueous solution may be at least one of a neutron moderator in the nuclear reactor or present in an emergency core cooling system. In some embodiments, the nuclear reactor has an emergency core cooling system. The emergency core cooling system includes a vessel containing a volume of the aqueous solution comprising at least one of polyhedral boron hydride anions or carborane anions and a conduit leading from the vessel to an applicator in a position to deliver the aqueous solution to the nuclear reactor core.

In this application:

Terms such as "a", "an" and "the" are not intended to refer to only a singular entity, but include the general class of which a specific example may be used for illustration. The terms "a", "an", and "the" are used interchangeably with the term "at least one".

The phrase "comprises at least one of" followed by a list refers to comprising any one of the items in the list and any combination of two or more items in the list. The phrase "at least one of" followed by a list refers to any one of the items in the list or any combination of two or more items in the list.

The term "contacting" includes applying the aqueous solution to the core using any suitable manner known in the art (e.g., pumping, injecting, pouring, releasing, displacing, spotting, or spraying aqueous solution).

The term "aqueous" refers to including water. The water may be $H_2O$ or $D_2O$.

All numerical ranges are inclusive of their endpoints and non-integral values between the endpoints unless otherwise stated.

DETAILED DESCRIPTION

Aqueous solutions useful for practicing the present disclosure include at least one of polyhedral boron hydride anions or carborane anions. Polyhedral boron hydride anions comprise only boron and hydrogen atoms. Carborane anions comprise only carbon, boron, and hydrogen atoms.

In some embodiments, the anions are polyhedral boron hydride anions. In some embodiments, the polyhedral boron hydride anions comprise at least one of $B_{10}H_{10}^{2-}$, $B_{11}H_{14}^{-}$, or $B_{12}H_{12}^{2-}$. In some embodiments, the polyhedral boron hydride anions comprise at least one of $B_{10}H_{10}^{2-}$ or $B_{12}H_{12}^{2-}$. In some embodiments, the polyhedral boron hydride anions comprise $B_{10}H_{10}^{2-}$. In some embodiments, the polyhedral boron hydride anions comprise $B_{11}H_{14}^-$. In some embodiments, the polyhedral boron hydride anions comprise $B_{12}H_{12}^{2-}$. The polyhedral boron hydride anions are typically provided in the aqueous solution by dissolution of Group I, Group II, ammonium salts, or alkyl ammonium salts, wherein alkyl is ethyl or methyl. The alkyl ammonium salts may be monoalkyl-, dialkyl-, trialkyl-, or tetraalkylammonium salts. In some embodiments, the polyhedral boron hydride anions are provided in the aqueous solution by dissolution of Group I, ammonium salts, or tetraalkyl ammonium salts, in some embodiments, Group I salts. Examples of suitable salts include $Li_2B_{10}H_{10}$, $Na_2B_{10}H_{10}$, $K_2B_{10}H_{10}$, $(NH_4)_2B_{10}H_{10}$, $[(C_2H_5)_3NH]_2B_{10}H_{10}$, $LiB_{11}H_{14}$, $NaB_{11}H_{14}$, $KB_{11}H_{14}$, $NH_4B_{11}H_{14}$, $Li_2B_{12}H_{12}$, $Na_2B_{12}H_{12}$, $K_2B_{12}H_{12}$, and $(NH_4)_2B_{12}H_{12}$.

In some embodiments, the anions are carborane anions. In some embodiments, the carborane anions comprise $CB_{11}H_{12}$. The carborane anions are typically provided in the aqueous solution by dissolution of Group I, Group II, ammonium salts, or alkyl ammonium salts, wherein alkyl is ethyl or methyl. The alkyl ammonium salts may be monoalkyl-, dialkyl-, trialkyl-, or tetraalkylammonium salts. In some embodiments, the carborane anions are provided in the aqueous solution by dissolution of Group I, ammonium salts, or tetraalkyl ammonium salts, in some embodiments, Group I salts. Examples of suitable salts include $LiCB_{11}H_{12}$, $NaCB_{11}H_{12}$, $KCB_{11}H_{12}$, $NH_4CB_{11}H_{12}$.

The aqueous solutions useful for practicing the present disclosure can include combinations of any of the anions or salts described above in any of their embodiments. Also, the aqueous solutions useful for practicing the present disclosure typically are free of organic polymers.

Polyhedral boron hydride salts can be prepared by known methods. For example, methods of preparing $MB_{11}H_{14}$ salts from metal borohydride or $MB_3H_8$ starting materials can be found in U.S. Pat. Nos. 4,115,520; 4,115,521; and 4,153,672 each to Dunks et al.

Pyrolysis of tetraalkyl ammonium borohydride salts under a variety of conditions has been reported to provide salts of the $B_{10}H_{10}^{2-}$ anion. See, for example, (1) W. E. Hill et al, "Boron Chemistry 4." Pergamon Press, Oxford 1979, p 33; (2) Mongeot et al Bull. Soc. Chim. Fr. 385, 1986; and (3) U.S. Pat. Nos. 4,150,057 and 4,391,993, both issued to Sayles. The tetraalkylammonium borohydride starting materials ($R_4NBH_4$) can be prepared by contacting sodium borohydride with one or more molar equivalents of a tetralkylammonium salt (e.g., tetralkylammonium hydrogensulfate) in an aqueous or alcohol solution. By regulating the temperature (e.g., through the use of precise internal temperature readings, methods for cooling the reaction mixture, and particular ramp and isothermal profiles), pyrolysis of tetraalkylammonium borohydride salts can provide salts of the $B_{10}H_{10}^{2-}$ and/or $B_{12}H_{12}^{2-}$ anion in good yield as reported in U.S. Pat. No. 7,524,477 (Spielvogel et al.). For example, in some methods of preparing $B_{10}H_{10}^{2-}$, $B_9H_9^-$, $B_{11}H_{14}^-$, and/or $B_{12}H_{12}^{2-}$, the $R_4NBH_4$ is dissolved, suspended, or mixed with a solvent having a boiling point of at least about 100° C. and heated. Examples of useful solvents include $C_8$-$C_{18}$ alkanes or mixtures of $C_8$-$C_{18}$ alkanes, including n-dodecane and mixtures of n-decane and n-dodecane. In other methods of preparing $B_{10}H_{10}^{2-}$, $B_9H_9^-$, $B_{11}H_{14}^-$, and/or $B_{12}H_{12}^{2-}$, a mixture of $R_4NBH_4$ and a trialkylamine borane adduct is pyrolyzed. A ratio of the borohydride to the trialkylamine borane is typically between about 1:3 to about 3:1, and this ratio can be 1:1. In these methods, pyrolysis at a temperature of about 185° C. typically provides a mixture of tetraalkylammonium $B_{10}H_{10}^{2-}$ and tetraalkylammonium $B_{12}H_{12}^{2-}$ salts in a ratio of about 1.4:1. Various cations for the polyhedral boron hydride salts can be provided, for example, by ion exchange methods.

Further methods for preparing $B_{12}H_{12}^{2-}$ salts are reported, for example, in U.S. Pat. No. 7,718,154 (Ivanov et al.), which describes reaction of a metal hydride with an alkyl borate in the presence of a Lewis base to produce a Lewis base-borane complex that is thermally decomposed to form the $B_{12}H_{12}^{2-}$ salt, and U.S. Pat. No. 7,563,934 (Banavali et al.), which describes reaction of a metal borohydride with $XBH_3$, where X is a substituted amine, a substituted phosphine, or tetrahydrofuran.

Syntheses of $CB_{11}H_{12}$ salts are also known. See, e.g., Knoth, W. H., Journal of the American Chemical Society, 1967, vol. 89, page 1274; Jelinek, T. et al., Collection of Czechoslovak Chemical Communications, 1986, vol. 51, page 819; and Franken, A., et al., Collection of Czechoslovak Chemical Communications, 2001, vol. 66, pages 1238-1249.

Of the two naturally occurring isotopes of boron ($^{11}B$ and $^{10}B$), $^{10}B$ is a better neutron absorber with a thermal neutron absorption cross section of approximately 3800 barns (3.8× $10^{-24}$ $m^2$). Accordingly, in some embodiments, the polyhedral boron hydride anions, including in any of the aforementioned salts, are enriched in $^{10}B$. A variety of procedures are available for the synthesis of $^{10}B$ enriched polyhedral boron hydride salts. In general, the syntheses begin with $^{10}B$ enriched boric acid, which can be converted to borohydride salts. Enriched borohydrides can be used with any of the methods described above, for example, to provide salts enriched in $^{10}B$. In some embodiments, at least one of the tetraalkylammonium borohydride salts or the trialkylamine borane adduct included in a pyrolysis mixture described above is enriched in $^{10}B$. Isotopically enriched $B_{11}H_{14}^-$ salts from isotopically enriched boric acid are described in U.S. Pat. No. 7,641,879 (Spielvogel).

At least some of the salts (e.g., $Li_2B_{10}H_{10}$, $Na_2B_{10}H_{10}$, $K_2B_{10}H_{10}$, $(NH_4)_2B_{10}H_{10}$, $LiB_{11}H_{14}$, $NaB_{11}H_{14}$, $KB_{11}H_{14}$, $NH_4B_{11}H_{14}$, $Li_2B_{12}H_{12}$, $Na_2B_{12}H_{12}$, $K_2B_{12}H_{12}$, and $(NH_4)_2B_{12}H_{12}$) including $^{10}B$ enriched salts are commercially available from Boron Specialties LLC, Valencia, Pa.

In some embodiments, the polyhedral boron hydride anions or carborane anions are provided in the aqueous solution by dissolution of $Li_2B_{10}H_{10}$, $LiB_{11}H_{14}$, $LiCB_{11}H_{12}$, or $Li_2B_{12}H_{12}$. In some embodiments, the polyhedral boron hydride salt is $Li_2B_{10}H_{10}$. In some embodiments, the polyhedral boron hydride salt is $Li_2B_{12}H_{12}$. In some embodiments, the polyhedral boron hydride salt is $LiB_{11}H_{14}$. In some embodiments, the carborane salt is $LiCB_{11}H_{12}$. Because of the low atomic mass of lithium, such salts may have the highest weight percentage of boron in comparison to other polyhedral boron hydride salts or carborane salts. Furthermore, as discussed in greater detail below, the lithium salts may have some of the highest water solubilities of the polyhedral boron hydride salts. $^7Li$ is the most common lithium isotope accounting for 92.5 percent of the atoms. However, $^7Li$ is neutron transparent, and it may be useful in some embodiments for any one of $Li_2B_{10}H_{10}$, $LiB_{11}H_{14}$, $LiCB_{11}H_{12}$, or $Li_2B_{12}H_{12}$ to be enriched in $^7Li$. The enrichment in $^7Li$ can be carried out by treating $(Et_4N)_2B_{10}H_{10}$, $Et_4NB_{11}H_{14}$, $(Et_4N)_2B_{12}H_{12}$, or a carborane salt prepared according to the methods described above, with commercially available $^7LiOH$ in water.

Polyhedral boron hydride and carborane salts are useful in the methods and nuclear reactors disclosed herein, for example, because of their generally high boron content. While boric acid is only 17.5% by weight boron, typically, polyhedral boron hydride and carborane salts useful for practicing the present disclosure have at least 25 percent by weight boron, based on the total molecular weight of the salt. For example, $Cs_2B_{10}H_{10}$ is 28% by weight boron. In other examples, $Li_2B_{10}H_{10}$, $Na_2B_{10}H_{10}$, and $(NH_4)_2B_{10}H_{10}$ are 81.9%, 65.9%, and 70.1% by weight boron, respectively. In further examples, $Li_2B_{12}H_{12}$, $Na_2B_{12}H_{12}$, and $(NH_4)_2B_{12}H_{12}$ are 83.3%, 69.1%, and 72.9% by weight boron, respectively. In yet other examples, $LiCB_{11}H_{12}$, $NaCB_{11}H_{12}$, and $KCB_{11}H_{12}$ are 79.3%, 71.6%, and 65.3% by weight boron, respectively. In some embodiments, the polyhedral boron hydride salts or carborane salts have at least 30, 35, 40, 45, 50, 55, 60, or 65 percent by weight boron, based on the total molecular weight of the salt.

Polyhedral boron hydride salts are also useful in the methods and nuclear reactors disclosed herein, for example, because of their high solubilities in water. While boric acid is typically reported to have a solubility in water of only about 4.7 grams per 100 grams of solution at 20° C., typically, polyhedral boron hydride salts useful for practicing the present disclosure have solubilities of at least 15 grams per 100 grams of solution at 20° C. or at least three times the water solubility of boric acid. In some embodiments, the polyhedral boron hydride salts useful for practicing the present disclosure have water solubilities of at least 20, 25, 30, 35, 40, 45, or at least 50 grams per 100 grams of solution at 20° C. Certain carborane salts are also expected to have useful water solubilities. $CB_{11}H_{12}^-$, for example, is a very weakly coordinating anion. The water solubilities for many different salts and the method for determining these solubilities are reported in the Examples, below.

The method according to the present disclosure can be practiced on any type of nuclear reactor, and similarly, the nuclear reactor according to the present disclosure includes a variety of types. In some embodiments, the nuclear reactor is a light water reactor, a boiling water reactor, a pressurized water reactor, a small modular reactor, or a heavy water reactor. In some embodiments, the nuclear reactor is a light water reactor, which may be a boiling water reactor or a pressurized water reactor.

In some embodiments, the nuclear reactor according to the present disclosure and/or cooled according to the method of the present disclosure is a light water reactor. In a light water reactor, the primary coolant is $H_2O$, which flows through the reactor core to extract heat to generate steam or for some other useful purpose. For electrical power generation, the steam is used to drive a generator turbine. In thermal nuclear reactors, the primary coolant water also serves as a neutron moderator that thermalizes neutrons, which enhances reactivity of the fissionable material. Various reactivity control mechanisms, such as mechanically operated control rods and chemical treatment of the primary coolant with a soluble neutron poison are employed to regulate the reactivity and resultant heat generation.

In some embodiments, the nuclear reactor according to the present disclosure and/or cooled according to the method of the present disclosure is a boiling water reactor (BWR). A BWR is a type of light water reactor, described above, in which the primary coolant water boils to generate the steam. The primary coolant water is typically maintained in a reactor pressure vessel that also contains the reactor core. In some embodiments of the method and nuclear reactor according to the present disclosure, the aqueous solution disclosed herein is contained in the reactor pressure vessel.

In some embodiments, the nuclear reactor according to the present disclosure and/or cooled according to the method of the present disclosure is a pressurized water reactor (PWR). A PWR is a type of light water reactor, described above, with the primary coolant water maintained in a superheated state in a sealed pressure vessel that also contains the reactor core. This hot water, which does not boil, then exchanges heat with a secondary, lower pressure water system, which turns to steam and drives the turbine. In the PWR, both pressure and temperature of the primary coolant water are controlled. In some embodiments of the method and nuclear reactor according to the present disclosure, the aqueous solution disclosed herein is contained in the reactor pressure vessel.

In some embodiments, the nuclear reactor according to the present disclosure and/or cooled according to the method of the present disclosure is a heavy water reactor (HWR). A HWR operates like a PWR, described above, but the primary cooling water is $D_2O$ instead of $H_2O$.

In some embodiments, the nuclear reactor is a small modular reactor. Such reactors typically have an electricity output of less than 500 megawatts (MW). Modular reactors are designed to be manufactured and assembled at a central factory location and then sent to their new location for installation. The small modular reactors may be light water cooled or heavy water cooled and may be boiling water reactors or pressurized water reactors.

The method according to the present disclosure can be useful, in some embodiments, as an emergency shutdown procedure for a nuclear reactor. The nuclear reactor to be shut down may be any of those described above. In some embodiments, including embodiments of the method and nuclear reactor according to the present disclosure, an emergency core cooling system is useful for the emergency shutdown procedure. In some emergency core cooling systems, spray nozzles are positioned to spray coolant directly onto the fuel rods, suppressing the generation of steam. The emergency core cooling system can include a vessel containing coolant and a conduit leading from the vessel to an applicator in a position to deliver the coolant to the nuclear reactor core. The applicator may use any method of placing the coolant in contact with the nuclear reactor core (e.g., pumping, injecting, pouring, releasing, displacing, spotting, or spraying). In some embodiments, the applicator is an injector or a sprayer (e.g., shower head or spray nozzle). An aqueous solution comprising at least one of polyhedral boron hydride anions or carborane anions in any of the embodiments described above can be useful as the coolant in the emergency core cooling system. The polyhedral boron hydride anions or carborane anions come into contact with the nuclear reactor core and can act as neutron poisons so that the nuclear fission reaction is stopped. Examples of useful emergency shutdown systems are shown in U.S. Pat. Appl. Pub. Nos. 2010/0239062 (Yeon et al.) and 2012/0243651 (Malloy).

Most nuclear reactors, including those of the BWR and PWR types, are required to have an available emergency pool with soluble boron in case emergency shutdown becomes necessary. Typically the emergency pool contains either a saturated boric acid or sodium pentaborate solution which is pumped into the reactor to quench the fission reaction. The aqueous solutions disclosed herein that include at least one of polyhedral boron hydride anions or carborane anions provide several advantages over boric acid and sodium pentaborate solutions in emergency shutdown situations. First, in some embodiments, the greater solubility of polyhedral boron hydride and carborane salts in comparison to boric acid and sodium pentaborate can allow for more rapid introduction of the neutron poison leading to faster quenching of the fission reaction. A lower volume of water may be used with the polyhedral boron hydride salts and some polyhedral carborane salts because of the increased solubility, which may preserve the safety seals of the reactor system. In boiling water reactors, introduction of traditional soluble boron during an emergency event will result in the reactor core being unrecoverable due to the corrosion caused by the soluble boron systems in such an event. Boric acid and sodium pentaborate deposits are known to cause severe corrosion in reactor systems through several mechanisms (e.g., galvanic corrosion and corrosion due to decreased pH). It is believed that polyhedral boron hydride and carborane salts disclosed herein will be considerably less corrosive since they are more soluble and pH neutral.

The method according to the present disclosure can also be useful, in some embodiments, as a neutron moderator during normal operation of the nuclear reactor. For $^{235}$U, for example, slower neutrons are more likely to cause a fission reaction. In order to slow down the neutrons in a reactor core, a moderator is used. The moderator can include light or heavy water as described above and the polyhedral boron hydride anions or carborane anions disclosed herein. The nuclear reactor including the neutron moderator may be any of those described above although in some cases, small modular reactors are operated without a neutron moderator. The presence of the polyhedral boron hydride anions or carborane anions disclosed herein can facilitate power leveling by serving as "chemical shims". Throughout the lifetime of a fuel load, the energy released from fuel rods will continually decrease, which leads to decreasing energy output from the reactor. This is not desirable. In order to balance the reactivity, a portion of the fuel itself is covered with neutron poisons, which evens the neutron flux, and, therefore the fission reaction. Further power leveling is achieved through the use of "chemical shims" in the moderator.

Certain characteristics of boric acid limit its utility as a chemical shim. For example, boric acid corrosion due to deposits can compromise the integrity of the pressure vessel and related systems. Due to increased solubility the polyhedral boron hydride salts and certain polyhedral carborane salts will not be as prone to deposition, and if deposits do occur they are not expected to have the same corrosiveness. Also, the use of boric acid as a chemical shim results in a slightly acidic pH, which can lead to corrosion of the fuel rod cladding. To bring the pH to acceptable levels, $^7$LiOH is added to the water. However, the presence of too much LiOH can also lead to corrosion of the cladding. To further protect the cladding from corrosion, depleted zinc oxide, which interacts with the fuel cladding material, is typically added. The polyhedral boron hydride and carborane salts are pH neutral, which may reduce or eliminate the expensive LiOH and depleted zinc oxide used in these reactors.

Furthermore, the use of polyhedral boron hydride salts in aqueous solutions in the method and nuclear reactors according to the present disclosure will not introduce any additional atoms to the reactor core that are currently not present. The polyhedral boron hydride and carborane anions are typically thermally stable and non-toxic. The cage structure of polyhedral boron hydride and carborane anions renders them highly chemically stable, which allows for long term storage. The aqueous solutions containing these salts are then ready to use when needed.

SOME EMBODIMENTS OF THE DISCLOSURE

In a first embodiment, the present disclosure provides a method of cooling a nuclear reactor core, the method comprising:

contacting the nuclear reactor core with an aqueous solution comprising at least one of polyhedral boron hydride anions or carborane anions.

In a second embodiment, the present disclosure provides the method of the first embodiment, wherein the aqueous solution is used as a neutron moderator during normal operation of the nuclear reactor.

In a third embodiment, the present disclosure provides the method of the first embodiment, wherein contacting the nuclear reactor core with the aqueous solution is carried out during an emergency shutdown of the nuclear reactor.

In a fourth embodiment, the present disclosure provides a nuclear reactor comprising an aqueous solution comprising at least one of polyhedral boron hydride anions or carborane anions as a neutron moderator, in an emergency core cooling system, or both as a neutron moderator and in an emergency core cooling system.

In a fifth embodiment, the present disclosure provides the nuclear reactor of the fourth embodiment, wherein the nuclear reactor comprises the aqueous solution comprising the at least one of polyhedral boron hydride anions or carborane anions in the emergency core cooling system, the emergency core cooling system comprising:

a vessel containing a volume of an aqueous solution comprising the at least one of polyhedral boron hydride anions or carborane anions; and a conduit leading from the vessel to an applicator in a position to deliver the aqueous solution to the nuclear reactor core.

In a sixth embodiment, the present disclosure provides the nuclear reactor of the fifth embodiment, wherein the applicator is an injector or a sprayer.

In a seventh embodiment, the present disclosure provides the method or nuclear reactor of any one of the first to sixth embodiments, wherein the at least one of polyhedral boron hydride anions or carborane anions are enriched in $^{10}$B.

In an eighth embodiment, the present disclosure provides the method or nuclear reactor of any one of the first to seventh embodiments, wherein the at least one of polyhedral boron hydride anions or carborane anions are provided by dissolved Group I or ammonium salts.

In a ninth embodiment, the present disclosure provides the method or nuclear reactor of the eighth embodiment, wherein the Group I or ammonium salts have at least 25 percent by weight boron.

In a tenth embodiment, the present disclosure provides the method or nuclear reactor of the eighth or ninth embodiment, wherein the Group I or ammonium salts have a water solubility of at least 15 grams per 100 grams of solution at 20° C.

In an eleventh embodiment, the present disclosure provides the method or nuclear reactor of any one of the first to tenth embodiments, wherein the anions are polyhedral boron hydride anions comprising at least one of $B_{10}H_{10}^{2-}$, $B_{11}H_{14}^-$, or $B_{12}H_{12}^{2-}$.

In a twelfth embodiment, the present disclosure provides the method or nuclear reactor of the eleventh embodiment, wherein the polyhedral boron hydride anions comprise at least one of $B_{10}H_{10}^{2-}$ or $B_{12}H_{12}^{2-}$.

In a thirteenth embodiment, the present disclosure provides the method or nuclear reactor of the twelfth embodiment, wherein the polyhedral boron hydride anions are from a dissolved salt selected from the group consisting of $Li_2B_{10}H_{10}$, $Na_2B_{10}H_{10}$, $K_2B_{10}H_{10}$, $(NH_4)_2B_{10}H_{10}$, $Li_2B_{12}H_{12}$, $Na_2B_{12}H_{12}$, $K_2B_{12}H_{12}$, $(NH_4)_2B_{12}H_{12}$, and combinations thereof.

In a fourteenth embodiment, the present disclosure provides the method or nuclear reactor of the eleventh embodiment, wherein the $Li_2B_{10}H_{10}$ or $Li_2B_{12}H_{12}$ is enriched in $^7Li$.

In a fifteenth embodiment, the present disclosure provides the method or nuclear reactor of the eleventh embodiment, wherein the polyhedral boron hydride anions comprise $B_{11}H_{14}^-$, wherein the polyhedral boron hydride anions are from a dissolved salt selected from the group consisting of $LiB_{11}H_{14}$, $NaB_{11}H_{14}$, $KB_{11}H_{14}$, and $(NH_4)B_{11}H_{14}$, and optionally wherein the $LiB_{11}H_{14}$ is enriched in $^7Li$.

In a sixteenth embodiment, the present disclosure provides the method or nuclear reactor of any one of the first to tenth embodiments, wherein the anions are carborane anions, wherein the carborane anions comprise $CB_{11}H_{12}^-$, wherein the carborane anions are from a dissolved salt selected from the group consisting of $LiCB_{11}H_{12}$, $NaCB_{11}H_{12}$, $KCB_{11}H_{12}$, $NH_4CB_{11}H_{12}$, and optionally wherein the $LiCB_{11}H_{12}$ is enriched in $^7Li$.

In a seventeenth embodiment, the present disclosure provides the method or nuclear reactor of any one of the first to fifteenth embodiments, wherein the nuclear reactor is a light water reactor, a boiling water reactor, a pressure water reactor, a small modular reactor, or a heavy water reactor.

The following specific, but non-limiting, examples will serve to illustrate the present disclosure.

EXAMPLES

The salts in the Table, below, can be useful in the method and nuclear reactor according to the present disclosure in any of the above embodiments.

Salt solubilities indicated in the Table, below, were determined by the following procedure. A known quantity of water (either 25 grams or 50 grams) was added to a 2-necked round bottomed flask with thermometer and stir bar on a magnetic stir plate. The solute (salt) was analytically weighed and added to the solvent in approximately 0.1-g increments while measuring the temperature of the solution. Solute was added until turbidity was observed in the solution after addition and agitation. Solubility in grams per 100 grams solution was then calculated and provided the Table, below. The temperature range measured was 18° C. to 21° C.

TABLE

Salt solubilities in grams per 100 grams of solution

|  | Li | Na | K | Cs | $(C_2H_5)_3NH$ |
| --- | --- | --- | --- | --- | --- |
| $B_{12}H_{12}^{2-}$ salts | 54.7 | 50.4 | 40.7 | 2.3 | 1.6 |
| $B_{10}H_{10}^{2-}$ salts | 58.4 | 56.9 | 38.0 | 4.2 | 15.7 |

Various modifications and alterations of this disclosure may be made by those skilled the art without departing from the scope and spirit of the disclosure, and it should be understood that this invention is not to be unduly limited to the illustrative embodiments set forth herein.

What is claimed is:

1. A method of cooling a core of a nuclear reactor, the method comprising:
 contacting the nuclear reactor core with an aqueous solution comprising at least one of polyhedral boron hydride anions or carborane anions dissolved in the aqueous solution.

2. The method of claim 1, wherein the at least one of polyhedral boron hydride anions or carborane anions are enriched in $^{10}B$.

3. The method of claim 1, wherein the at least one of polyhedral boron hydride anions or carborane anions comprise at least one of $B_{10}H_{10}^{2-}$, $B_{11}H_{14}^-$, $CB_{11}H_{12}^-$, or $B_{12}H_{12}^{2-}$.

4. The method of claim 1, wherein the aqueous solution comprises polyhedral boron hydride anions dissolved in the aqueous solution.

5. The method of claim 4, further comprising dissolving a salt selected from the group consisting of $Li_2B_{10}H_{10}$, $Na_2B_{10}H_{10}$, $K_2B_{10}H_{10}$, $(NH_4)_2B_{10}H_{10}$, $LiB_{11}H_{14}$, $NaB_{11}H_{14}$, $KB_{11}H_4$, $(NH_4)B_{11}H_{14}$, $Li_2B_{12}H_{12}$, $Na_2B_{12}H_{12}$, $K_2B_{12}H_{12}$, $(NH_4)_2B_{12}H_{12}$, and combinations thereof in water to provide the aqueous solution.

6. The method of claim 1, further comprising dissolving a Group I or ammonium salt comprising the at least one of polyhedral boron hydride anions or carborane anions in water to provide the aqueous solution.

7. The method of claim 6, wherein the Group I or ammonium salt has at least 25 percent by weight boron.

8. The method of claim 1, further comprising dissolving a salt having a water solubility of at least 15 grams per 100 grams of solution at 20° C. in water to provide the aqueous solution comprising the at least one of polyhedral boron hydride anions or carborane anions dissolved in the aqueous solution.

9. The method of claim 1, wherein the nuclear reactor is a light water reactor, a boiling water reactor, a pressure water reactor, a reactor having an electricity output of less than 500 megawatts, or a heavy water reactor.

10. The method of claim 1, wherein contacting the nuclear reactor core with the aqueous solution is carried out during an emergency shutdown of the nuclear reactor.

11. A nuclear reactor comprising a nuclear reactor core including an aqueous solution,
 wherein the aqueous solution includes at least one of polyhedral boron hydride anions or carborane anions dissolved therein,
 wherein the aqueous solution is a part of at least one of:
 core coolant usable in operation of the nuclear reactor core, and
 core coolant usable in emergency cooling of the nuclear reactor core.

12. The nuclear reactor of claim 11, wherein the at least one of polyhedral boron hydride anions or carborane anions are enriched in $^{10}B$.

13. The nuclear reactor of claim 11, wherein the at least one of polyhedral boron hydride anions or carborane anions comprise at least one of $B_{10}H_{10}^{2-}$, $B_{11}H_{14}^-$, $CB_{11}H_{12}^-$, or $B_{12}H_{12}^{2-}$.

14. The nuclear reactor of claim 11, wherein the aqueous solution comprises polyhedral boron hydride anions dissolved in the aqueous solution.

15. The nuclear reactor of claim 14, wherein the aqueous solution comprises a dissolved salt selected from the group consisting of $Li_2B_{10}H_{10}$, $Na_2B_{10}H_{10}$, $K_2B_{10}H_{10}$, $(NH_4)_2B_{10}H_{10}$, $LiB_{11}H_{14}$, $NaB_{11}H_{14}$, $KB_{11}H_{14}$, $(NH_4)B_{11}H_{14}$, $Li_2B_{12}H_{12}$, $Na_2B_{12}H_{12}$, $K_2B_{12}H_{12}$, $(NH_4)_2B_{12}H_{12}$, and combinations thereof.

16. The nuclear reactor of claim 11, wherein the aqueous solution comprises a dissolved Group I or ammonium salt.

17. The nuclear reactor of claim 16, wherein the Group I or ammonium salt has at least 25 percent by weight boron.

18. The nuclear reactor of claim 11, wherein the aqueous solution comprises a dissolved salt having a water solubility of at least 15 grams per 100 grams of solution at 20° C.

19. The nuclear reactor of claim 11, wherein the nuclear reactor is a light water reactor, a boiling water reactor, a pressure water reactor, a reactor having an electricity output of less than 500 megawatts, or a heavy water reactor.

20. The nuclear reactor of claim 11,
   wherein the nuclear reactor comprises an emergency core cooling system,
      the emergency core cooling system comprising:
         a vessel containing an emergency aqueous solution that includes at least one of polyhedral boron hydride anions or carborane anions dissolved therein; and
         a conduit leading from the vessel to an applicator positioned to deliver the emergency aqueous solution to the nuclear reactor core.

\* \* \* \* \*

UNITED STATES PATENT AND TRADEMARK OFFICE
CERTIFICATE OF CORRECTION

PATENT NO. : 10,679,759 B2
APPLICATION NO. : 14/777293
DATED : June 9, 2020
INVENTOR(S) : Kevin Cook et al.

Page 1 of 1

It is certified that error appears in the above-identified patent and that said Letters Patent is hereby corrected as shown below:

In the Specification

Column 3
Line 18, delete "$CB_{11}H_{12}$." and insert -- $CB_{11}H_{12}^{-}$. --, therefor.

Column 4
Line 13, delete "$CB_{11}H_{12}$" and insert -- $CB_{11}H_{12}^{-}$ --, therefor.

In the Claims

Column 10
Line 14, in Claim 5, delete "$KB_{11}H_{4}$," and insert -- $KB_{11}H_{14}$, --, therefor.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*